(12) United States Patent
Lautenschlaeger et al.

(10) Patent No.: US 10,789,274 B2
(45) Date of Patent: Sep. 29, 2020

(54) REPLICATING DATA IN A MULTI-CLOUD ENVIRONMENT

(71) Applicant: SAP SE, Walldorf (DE)

(72) Inventors: Benjamin Lautenschlaeger, Neuhofen (DE); Florian Trossbach, Neustadt (DE)

(73) Assignee: SAP SE, Walldorf (DE)

(*) Notice: Subject to any disclaimer, the term of this patent is extended or adjusted under 35 U.S.C. 154(b) by 345 days.

(21) Appl. No.: 15/907,233

(22) Filed: Feb. 27, 2018

(65) Prior Publication Data

US 2019/0266277 A1    Aug. 29, 2019

(51) Int. Cl.
*G06F 16/27* (2019.01)
*G06F 16/22* (2019.01)
*G06F 16/23* (2019.01)

(52) U.S. Cl.
CPC ........ *G06F 16/278* (2019.01); *G06F 16/2219* (2019.01); *G06F 16/2322* (2019.01); *G06F 16/27* (2019.01)

(58) Field of Classification Search
CPC .... G06F 16/278; G06F 16/27; G06F 16/2219; G06F 16/2322
USPC ........................................................ 707/610
See application file for complete search history.

(56) References Cited

U.S. PATENT DOCUMENTS

| 7,430,569 | B2* | 9/2008 | Conrad ................. G06F 16/27 |
| 7,685,143 | B2 | 3/2010 | Tsui et al. |
| 7,743,015 | B2 | 6/2010 | Schmitt |
| 8,762,642 | B2 | 6/2014 | Bates et al. |
| 9,672,123 | B2 | 6/2017 | Duggana et al. |
| 10,021,186 | B2* | 7/2018 | Grebnov ............. G06F 16/1844 |
| 2015/0178364 | A1 | 6/2015 | Dobre |
| 2016/0100004 | A1* | 4/2016 | Anglin ................ H04L 67/1097 709/219 |
| 2017/0300391 | A1 | 10/2017 | Namburi |
| 2019/0129751 | A1* | 5/2019 | Stanfill .................. G06F 9/546 |
| 2019/0243688 | A1* | 8/2019 | Karmarkar ............. G06F 16/27 |
| 2019/0245918 | A1* | 8/2019 | Xu ...................... G06F 16/1748 |

* cited by examiner

*Primary Examiner* — Michael Pham
(74) *Attorney, Agent, or Firm* — Fish & Richardson P.C.

(57) ABSTRACT

Methods and system are disclosed that replicate data between source databases and destination databases. In one aspect, the source databases and the destination databases may be deployed in multiple cloud computing environments. The mechanism for replicating data from a source database to a destination database may include receiving a request to replicate data. Based on multiple identifiers associated with data, a coordinator component may determine the data to be replicated. Based on the determination, the coordinator component may generate multiple replicator requests. The replicator requests may be sent to a replicator component by a processor component. The replicator component may execute the replicator requests to replicate the data from the source database to the destination database.

14 Claims, 8 Drawing Sheets

| COLUMN 1 302 | COLUMN 2 304 | ■■■ 306 | COLUMN N 308 | LAST UPDATED 310 |
|---|---|---|---|---|
| XXX | XXX | ■■■ | XXX | 2018-01-19 03:14:07 |
| XXX | XXX | ■■■ | XXX | 2018-01-19 03:14:08 |
| XXX | XXX | ■■■ | XXX | 2018-01-19 03:15:07 |
| XXX | XXX | ■■■ | XXX | 2018-01-19 04:15:47 |
| XXX | XXX | ■■■ | XXX | 2018-01-19 08:17:23 |

FIG. 3

| COMPONENT 602 | HTTP METHOD 604 | PATH 606 | URI PARAMETERS 608 | PAYLOAD/BODY 610 | RESPONSES 612 |
|---|---|---|---|---|---|
| PROCESSOR | POST | \<PROCESSOR-URI\>/TABLES/\<TABLE NAME\> | TIMESTAMPS: FROM, TO | REPLICATION REQUEST<br>{<br>FROM: 2018-01-19 03:14:07,<br>TO 2018-01-19 03:14:07,<br>TABLE: T_DELIVERED_ADS<br>} | HTTP STATUS 202 ACCEPTED |
| REPLICATOR | POST | \<REPLICATOR-URI\>/TABLES/\<TABLE NAME\> | NONE | REPLICATION DATA<br>[<br>{<br>"NAME": "CAMPAIGN_ID",<br>"VALUE": "6938240809937",<br>"TYPE": -5<br>}, {<br>"NAME": "CHARGE",<br>"VALUE": "0.0012619000",<br>"TYPE": 3<br>}, {<br>"NAME": "CLEARING_PRICE",<br>"VALUE": "1.26190",<br>"TYPE": -9<br>},<br>[...]<br>}] | HTTP STATUS CODE 200 OK IF REPLICATION DID SUCCEED<br><br>HTTP STATUS 503 INTERNAL SERVER ERROR IF AN ERROR OCCURED, E.G.<br>I) RECORD DUPLICATION<br>II) DATA FORMAT ERROR |

REPLICATING DATA IN A MULTI-CLOUD ENVIRONMENT

BACKGROUND

Enterprises offer services and applications by deploying them in distributed computing environments (e.g., cloud computing environments). Such environments may be geographically distributed, and end users may consume the services on demand, resulting in faster response time for processing requests to provide services and applications. However, when data may be accessed from geographically distributed locations, there may be a lag in response for data access as the data may not be locally available. Further, accessing such data from geographically distributed locations may add to complexity and challenges because of the data access from geographically distributed locations. Therefore, providing a mechanism for replicating or transferring data to a centralized location, such that the time for accessing data is optimized and overcoming the above complexities and challenges, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 is a table including data and timestamp information, according to an embodiment.

FIG. 6 is a table showing responses of components for replicating data, according to an embodiment.

DETAILED DESCRIPTION

Figure 1:
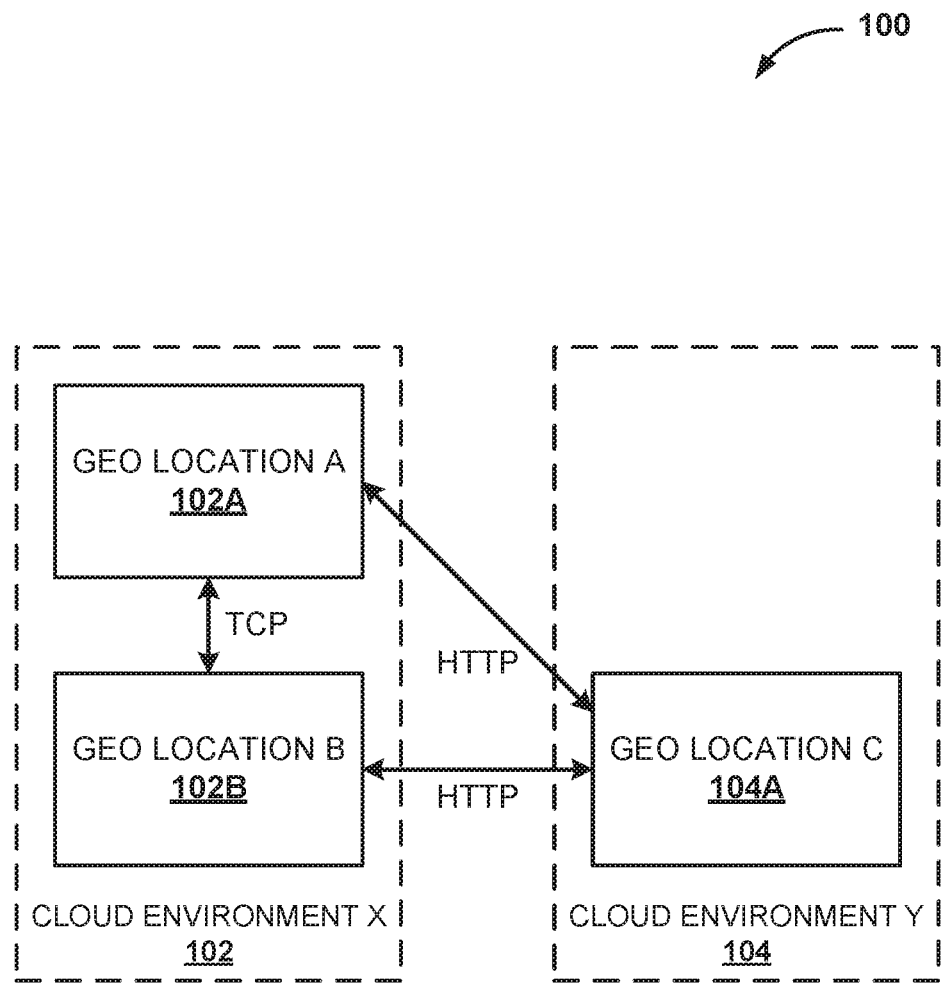
FIG. 1 is a block diagram illustrating a communication between multiple cloud computing environments, according to an embodiment.

Embodiments of techniques related to framework for generating adapters in an integrated development environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Technological advancements continue to propel a demand for connected devices, networks, platforms and integrated environments. Such advancements may increase a demand for integrated computing environments (e.g., cloud computing environments) such that users can interact via multiple geographically deployed systems and applications to execute operations and functionalities. Such integrated computing environments may provide a platform for unified architecture encompassing devices, systems and applications that may be scalable (e.g., on demand, based on evolving requirement, etc.). Further, data between multiple systems, applications, etc. may be stored in geographically distributed data stores. Such data stored in geographically distributed data stores may need to be replicated, e.g., from a satellite storage to a central storage. The data may be replicated by retrieving from source data stores and stored in destination data stores such that the integrity of the data is consistent and the data is transferred or replicated over a secured platform. In an embodiment, the replication of such data may be facilitated by cooperation between components (e.g., may depend on implementation requirements) of a framework for seamless data transfer. The components may either be co-deployed with the systems or applications in the cloud computing environment or may be packaged as a stand-alone application and deployed in the cloud computing environment. The components of the framework may work in cooperation with multiple on-premise or cloud platform applications or systems (e.g., proprietary and non-proprietary enterprise systems that may provide payment options) that may facilitate transferring data between multiple cloud computing environments.

In an embodiment, the terms software components or components, software routines or routines, software models or models, software engines or engines, software scripts or scripts, layers etc., are employed interchangeably throughout the subject specification, unless context warrants particular distinction(s) among the terms depending on implementation. The implementation primarily involves executing a computer readable code such as, a sequence of instructions by a processor of a computing device (e.g., a special purpose computer, a general-purpose computer, mobile device, etc.) in an integrated environment. The computing device is adaptable to function or execute operations (e.g., receiving requests for replicating or transferring data between source and destination databases, determining the data to be replicated based on identifiers associated with the data, generating replicator requests, sending the replicator requests to replicator component, executing the replicator requests to replicate data between source and destination databases, etc.), thereby adapting the computing device as a special purpose computer. In some instances, the memory may store instructions that may not be limited to the aforementioned specific operations or functionalities. Unless the context warrants particular distinction(s), the cooperative execution of the above described arrangement of components, scripts, routines, etc., providing specific operations or functionalities may further improve the functioning of the special purpose computer. Further the special purpose computer may be adapted to perform operations or functionalities (e.g., as described above) that were not performed previously. Further, the execution of the aforementioned specific operations or functionalities may also overcome the drawbacks or challenges, as described in the background section of the subject specification.

FIG. 1 is block diagram illustrating communication 100 between multiple cloud computing environments, according to an embodiment. In an embodiment, a multi-cloud computing environment may correspond to deployment of multiple cloud computing environments in geographically distributed locations (e.g., 102A, 102B and 104A). FIG. 1 shows communication between cloud computing environment 'X' 102 and cloud environment 104. The cloud computing environments (e.g., 102 and 104) may host multiple systems, applications, data stores, etc., that may be deployed at geographically distributed locations (e.g., 102A, 102B and 104A). Based on business requirements and implementation aspects, the cloud computing environments (e.g., cloud environment 'X' 102 and cloud environment 'Y' 104) including the systems, applications, data stores, etc., may communicate over a network using know protocols (e.g., transmission control protocols (TCP), hyper-text transfer protocol (HTTP), etc.). In an embodiment, the implementation of the systems, applications, etc., on the cloud computing environments may be different and the cloud computing environments may offer services or resources for consumption depending on end user or business requirements. For example, cloud computing environments may offer the services or resources for consumption as Infrastructure as a Service (IaaS) or Platform as a Service (PaaS). Such offerings may host systems, applications, data stores, etc., that may be implemented using different technologies and network configurations.

In an embodiment, when transferring data from one cloud computing environment (e.g., 102) to another cloud computing environment (e.g., 104), a framework or platform or an architecture of integrated components (not shown; interchangeably also used as component(s) in the subject specification) for transferring data may be technology agnostic. For example, the framework or platform or architecture to transfer data between the cloud computing environments (e.g., 102 and 104) may include components that may be integrated to work either independently or in cooperation. The components may be co-deployed with existing systems, applications, etc., in the cloud computing environment(s) or may be packaged into a standalone application and deployed in the cloud computing environment(s) (e.g. 102 and 104). The components (not shown) may execute specific operations or functions to facilitate the data transfer between the cloud computing environment(s) (e.g., 102 and 104). Such integration of components for data transfer may be scalable on-demand that may be facilitated by multiple deployment instances in multiple geographically distributed cloud computing environments.

Figure 2:
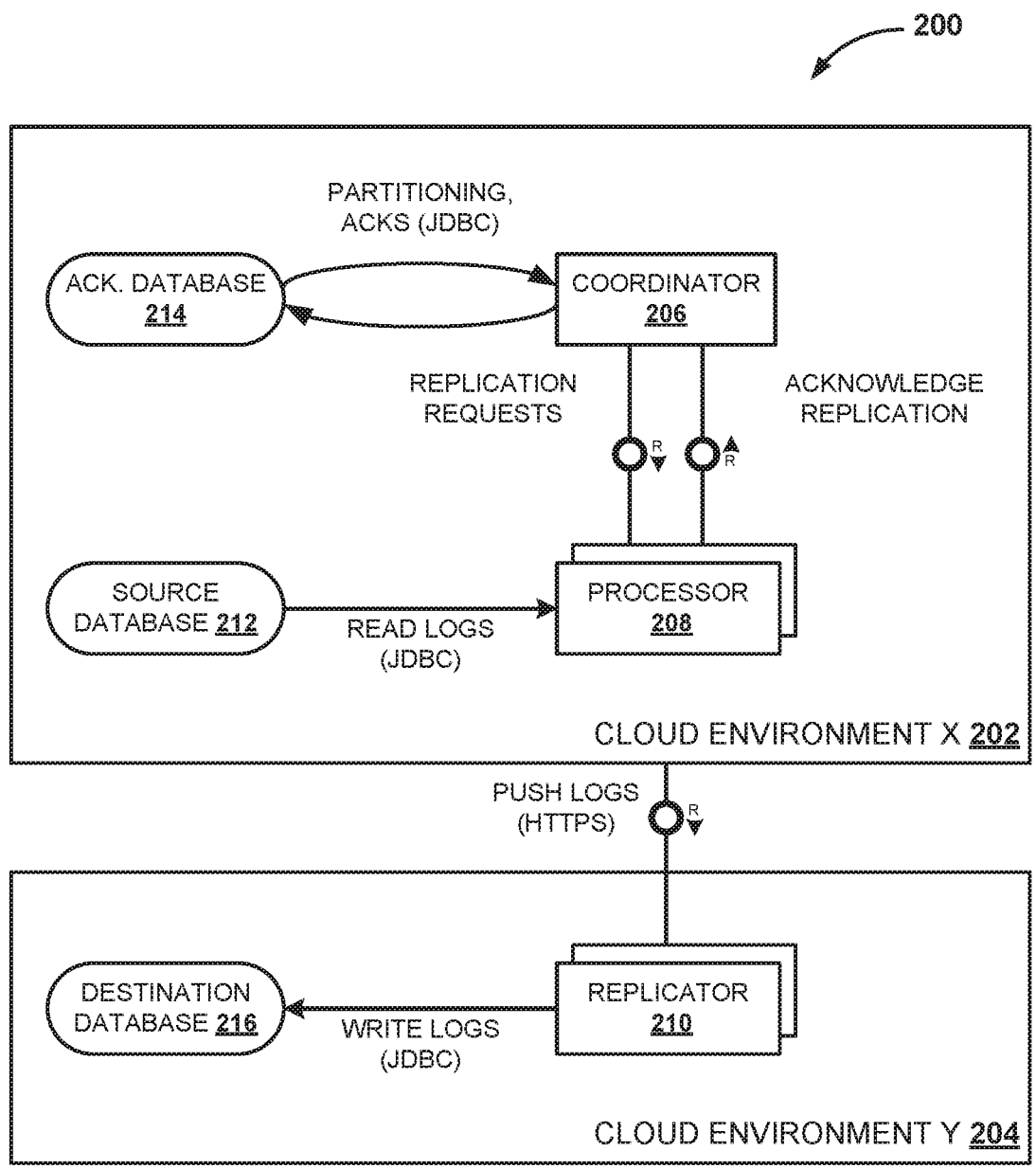
FIG. 2 is a block diagram illustrating an architecture including components for replicating or transferring data, according to an embodiment.

FIG. 2 is a block diagram illustrating architecture 200 including components (206, 208 and 210) for replicating or transferring data, according to an embodiment. In an embodiment, data stored in a data store deployed in one cloud computing environment (e.g., cloud environment 'X' 202) may be replicated or transferred to other data stores deployed in another cloud computing environment (e.g., cloud environment 'Y' 204). In an embodiment, the mechanism for replicating or transferring data between data stores (e.g., 212 and 216) may be implemented by co-deploying components (e.g. 206 and 208) in one cloud computing environment (e.g., 202). The cloud computing environment (e.g., 202) may include source database 212 from which the data may be replicated or transferred to another database (e.g., 216) in another cloud computing environment. In an embodiment, replicator 210 may be deployed in another environment (e.g., 204) that includes destination database 216. In another embodiment, the mechanism for replicating or transferring data between data stores or database (e.g., 212 and 216) may be implemented by integrating components (e.g., 206, 208 and 210) as an application that may be deployed as a stand-alone application in the cloud computing environments (e.g., 202 and 204). The terms data store(s) and database(s) may be used interchangeably in the subject specification and may correspond to a relational database, a web-based database, an in-memory database, etc. In an embodiment, the components (e.g., 206, 208 and 210) may work in cooperation and individually to facilitate an execution of specific operations or functions. The components (e.g., 206, 208 and 210) may be configured to communicate with each other via standard protocols (e.g., remote function calls to application package interfaces (APIs), secured hypertext transfer protocols (HTTPS), etc.). FIG. 2 shows architecture 200 including components (e.g., 206, 208 and 210) that may facilitate replication of data between multiple data stores (e.g., 212, 214 and 216) that may be deployed in multiple cloud computing environments (e.g., 202 and 204). As discussed previously, components (e.g., 206, 208 and 210) may either be co-deployed with the application or may be packaged into a single standalone application and deployed in the cloud computing environments (e.g., 202 and 204) based on implementation, As shown in FIG. 2, the component coordinator (hereinafter interchangeably also referred to as coordinator 206) deployed in cloud computing environment (e.g., 202) may communicate with processor 208, source database 212 and acknowledge (Ack.) database 214. The coordinator 206 may be configured to execute a sequence of instructions to implement a decision logic to determine the data to be replicated or transferred between multiple cloud computing environments (e.g., 202 and 204). In an embodiment, since coordinator 206 insures transfer of data accuracy across multiple cloud computing environments, not only is the distance from the request closer, but the data returned across multiple cloud computing environments is consistent. The coordinator 206 may determine the data to be replicated based on multiple identifiers. For example, such identifiers may be associated with data structure (e.g., table) storing the data or may be associated with columns stored in the table. Such columns may correspond to primary key of the table or may be marked with visual identifiers. Further, the identifiers that may be used to identify information for replicating data may include a combination of data from the data structure (e.g., tables) stored in acknowledgement data store. The identifiers may also include metadata information or configuration, for example, configuration of the time interval and the corresponding data that may be replicated, an amount or volume of data that may be replicated per process, information of whitelisted tables that may include the data to be replicated, etc. Upon determining the data that may be replicated or transferred, coordinator 206 may be configured to partition the data. The coordinator 206 may communicate with Ack. database 214 to execute partitioning of the data by establishing connection with source database 212 and ack. database 214 and may validate such partitions of the data via partitioning acknowledgment (acks.) messages. The coordinator 206 may communicate with ack. database 214 and source database via an application package interface (API) to establish connection with databases (e.g., 212 and 214). For example, Java® based database connectivity API may be called or executed by coordinator 206 to establish connection and communicate with source database 212 and ack. database 214. In an embodiment, the decision logic to partition the data for replication or transfer may include determining a time stamp associated with the data, determining transactions or functions executed on the data, etc. For example, such transactions or functions may include executing an INSERT or UPDATE sequel (SQL) query on the data. Upon execution of the SQL query on the data, the corresponding changes in the data may be stored in the rows and/or columns and the timestamp information stored in the table may be updated to reflect modifications in the data.

FIG. 3 is table 300 including data and timestamp information, according to an embodiment. FIG. 3 shows a data structure (e.g., a table) including columns 302, 304, 306, 308 and 310. The columns 302, 304, 306 and 308 may include values representing the data and the column 310 may include timestamp information. The timestamp information may be stored in the column (e.g., 310) by a data management component associated with the data store. The data management component may update the timestamp information, when an INSERT or UPDATE (e.g., sql query related to INSERT or UPDATE) operation on the data (e.g., 302, 304, 306 and 308) is executed.

As shown in FIG. 2, coordinator 206 may partition the data based on the timestamp information (e.g., 310 of FIG. 3). For example, timestamp information (e.g., 310 of FIG. 3) corresponding to the data to be replicated may be partitioned into multiple time intervals. The number of time intervals and size of each time interval may be defined and modified by coordinator 206. In an embodiment, coordinator 206 may be configured to periodically modify the time intervals associated with the data to be replicated. The coordinator 206 may use the time intervals information and the identifier(s) associated with the data structure (e.g. a table) to generate a data replication request (also referred to as replicator request). For example, the replicator request may be generated or defined as follows:

```
{
    from:    2018-01-19 03:12:07
    to:      2018-01-19 03:14:07
    table:   T_DELIVERED_ADS
}
```

In the above example, the replicator request includes the labels "from" and "to" representing the timestamp information (or alternately time intervals associated with the timestamp information) and the label "table" corresponds to the identifier or name of the table from which data may be replicated. Upon generating the replicator request, the replicator request may be asynchronously forwarded or sent to processor 208.

In an embodiment, upon receiving a request for data replication (e.g., replicator request), processor 208 may process the replicator request and forward/send it to replicator 210 for execution. For example, execution of the replicator request may correspond to executing queries (e.g., UPSERT statements). In an embodiment, processing the replicator request by processor 208 may include determining the information including the time intervals, serializing and compressing the data in the replicator request into multiple binary large objects (BLOBs) and a corresponding metadata information may also be generated. The BLOBs including the metadata information may be asynchronously forwarded by processor 208 to replicator component (hereinafter also referred to as replicator 210). For example, processor 208 may asynchronously forward the BLOBs to replicator 210 via a secured hypertext transfer protocol (HTTPS; e.g., Push Logs) request. In an embodiment, upon receiving the BLOBs from processor 208, replicator 210 may be configured to de-serialize the BLOBs and generate SQL queries (e.g., UPSERT statements) for replicating or transferring and storing the data in destination database 216. For example, the UPSERT statements may include INSERT or UPDATE data related SQL queries that may be executed at the destination database 216 to update or insert the data. In an embodiment, replicator 210 may generate the SQL queries based on the metadata information associated with the BLOBs. The replicator 210 may establish connection with the destination database 216 (e.g., via JDBC) and execute the generated SQL queries. When the execution of the SQL queries is successful, replicator 210 may acknowledge the replicator request with a HTTP status code 200 (e.g., indicating successful execution) to processor 208. When the execution of the SQL queries is not successful, the acknowledgement may include the HTTP status code 503 (e.g., indicating internal server error). Based on the response of the execution indicated via the HTTP status code, processor 208 may acknowledge the status of the replicator request to coordinator 206. In an embodiment, when the data replication request is not successful, processor 208 in cooperation with coordinator 206 and replicator 210 may retry the execution of the replicator request.

In an embodiment, coordinator 206 may be configured to track and maintain information of the replicator requests that were generated and sent to processor 208 and replicator 210. Such information may be stored in a data structure (e.g., table) associated with coordinator 206. When coordinator 206 determines that the replicator requests were not executed successfully, coordinator 206 in cooperation with processor 208 and replicator 210 may re-instantiate the execution of the replicator requests. In an embodiment, an attribute, for example, replication timeout may be configured to concurrently manage the data replication requests sent to processor 208 and replicator 210. The replicator timeout attribute may correspond to a timer that may be configured to process and send the replicator requests to processor 208 that may subsequently be executed by replicator 210. The replicator timeout attribute may facilitate management of sending multiple replicator requests to processor 208, that may be executed by replicator 210 at destination database 216. Such management of multiple replicator requests may prevent an overloading of the databases, when multiple replicator requests are received at processor 208. For example, when the execution of one or more replicator requests fails, coordinator 206 in cooperation with processor 208 and replicator 210, may re-instantiate or retry the execution of the replicator requests. The overloading of the databases with multiple data replication requests may therefore be managed by configuring replicator timeout attribute. In an embodiment, the mechanism for generating and sending the replicator requests may impact the data stored in source database 212. For example, when multiple replicator requests are generated and forwarded, replicator 210 may execute the replicator requests concurrently (e.g., in parallel). For example, replicator 210 may process and sequentially execute the replicator requests by determining the timestamp information, determining a priority with which the requests were generated, etc.

Figure 4:
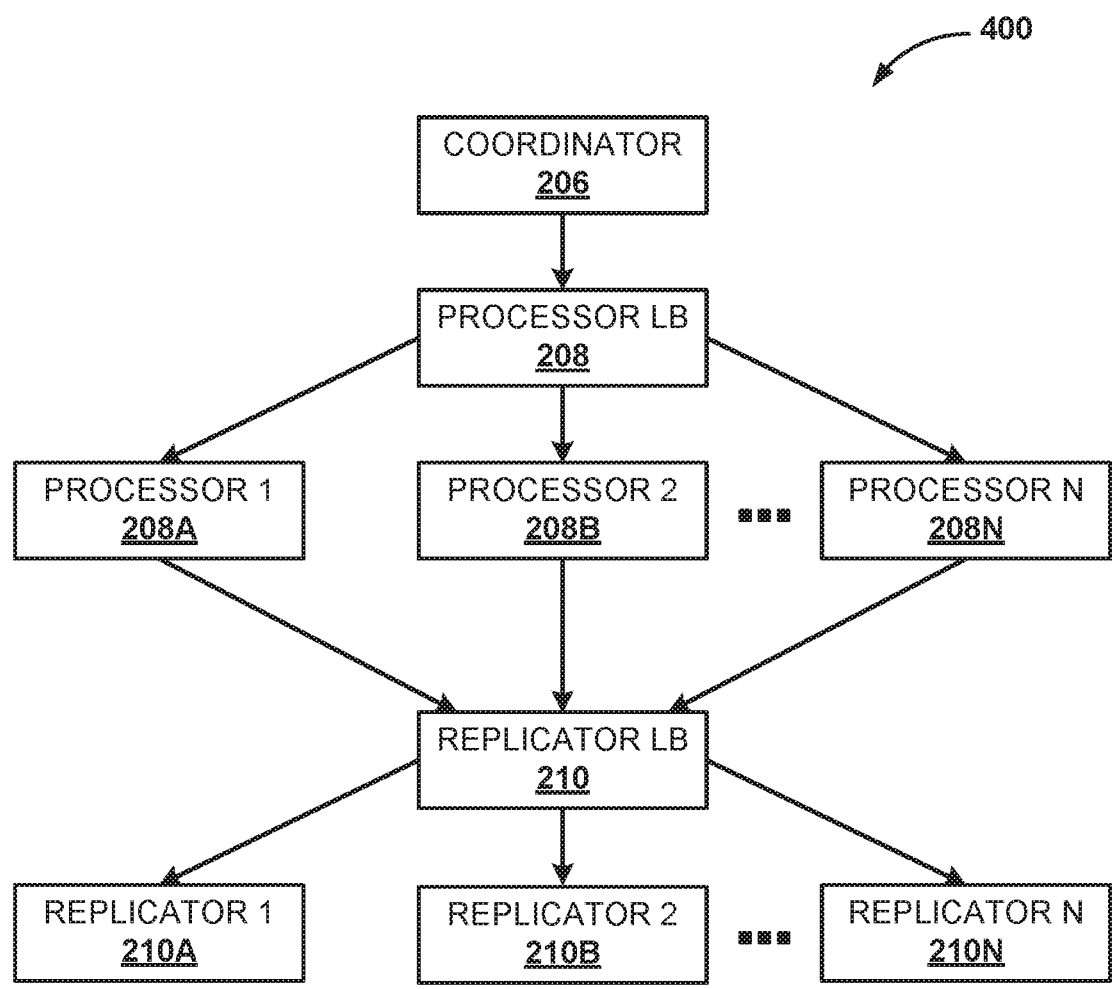
FIG. 4 is a block diagram illustrating a multi-instance deployment of processors and replicators, according to an embodiment.

FIG. 4 is block diagram 400 illustrating a multi-instance deployment of processors and replicators, according to an embodiment. As shown in FIG. 4, multiple processors (e.g., 208, 208A, 208B, . . . 208N) may be arranged and configured to receive multiple replicator requests from coordinator 206. Based on the number of replicator requests generated by coordinator 206, processor LB 208 may be configured to multiplex and forward the replicator requests to other processors (e.g., 208A, 208B, . . . 208N). The replicator LB 210 component may receive the replicator requests from multiple processors (e.g., 208A, 208B, . . . 208N) and may forward the replicator requests to other replicators (e.g., 210A, 210B, . . . 210N) for data replication in the corresponding destination databases (not shown). The operational efficacies and mechanism for replicating or transferring data by cooperative working of coordinator 206, processor 208 and replicator 210, is as explained above in detailed description with reference to FIG. 2.

Figure 5:
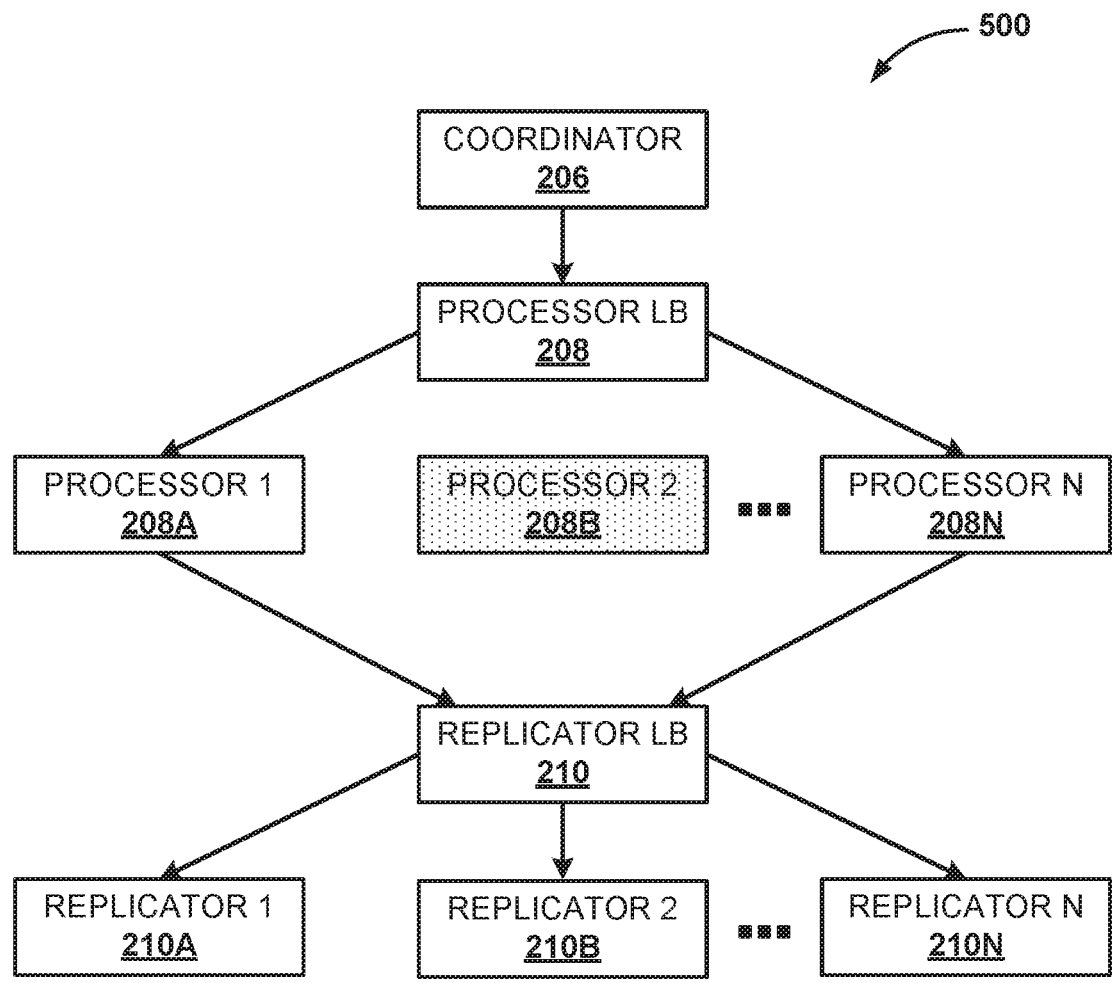
FIG. 5 is a block diagram illustrating a multi-instance deployment of processors and replicators, according to an embodiment.

FIG. 5 is block diagram 500 illustrating a multi-instance deployment of processors and replicators, according to an embodiment. As shown in FIG. 5, multiple processors (e.g., 208, 208A, 208B, . . . 208N) may be arranged and configured to receive replicator requests from coordinator 206. Based on the number of replicator requests generated by coordinator 206, processor LB 208 may be configured to multiplex and forward the replicator requests to other processors (e.g., 208A, 208B, . . . 208N). The replicator LB 210 component may receive the replicator requests from multiple processors (e.g., 208A, 208B, . . . 208N) and may forward the replicator requests to replicators (e.g., 210A, 210B, . . . 210N) for data replication in the corresponding destination databases (not shown). The operational efficacies of coordinator 206, processor 208 and replicator 210 is as explained above in detailed description with reference to FIG. 2. In an embodiment, the rate of data generation is not consistent and multiple systems, applications, etc., may depend on consistency and integrity of the data in cloud computing environments. The processors (e.g., 208A, 208B, . . . 208N) and replicators 210A, 210B, . . . 210N) may be stateless and multiple instances (e.g., as shown in FIG. 4 and FIG. 5) of components (e.g., 208 and 210) may be deployed in the cloud computing environment. The scenario of multiple instances of deployment may guarantee an availability of the components and bandwidth for processing replication requests from multiple geographically distributed data stores. For example, FIG. 5 shows an instance, where processor 2 208B (shaded) is unavailable to receive and process the replicator requests from coordinator 206. In such a scenario, the deployment of multiple instances of the components (e.g., 206, 208 and 210) guarantees that there is no significant impact on the requests for replication of data between multiple databases, when one or more instances of the components (e.g., combination of 206, 208 and 210) are non-functional or not available. Such above described arrangement provides flexibility and scalability when multiple replicator requests are concurrently processed and executed.

FIG. 6 is a table 600 showing responses of components for replicating data, according to an embodiment. In an embodiment, FIG. 6 shows a table including columns "Component" 602, "HTTP Method" 604, "Path" 606, "Universal Resource Indicator (URI) parameters" 608, "Payload/Body" 610, and "Responses" 612 of components processor 208 and replicator 210. The processor 208 may forward or send the replicator request received from coordinator 206 to replicator 210. The processor 208 may be instantiated by coordinator 206 and coordinator 206 may be configured to generate the replicator requests. The "Payload/Body" 610 shows an exemplary snippet that may be received and executed by respective components (e.g., processor 208 and replicator 210). In an embodiment, the replicator 210 may execute the replicator requests to transfer or replicate the data from the source data store(s) to destination data store(s).

Figure 7:
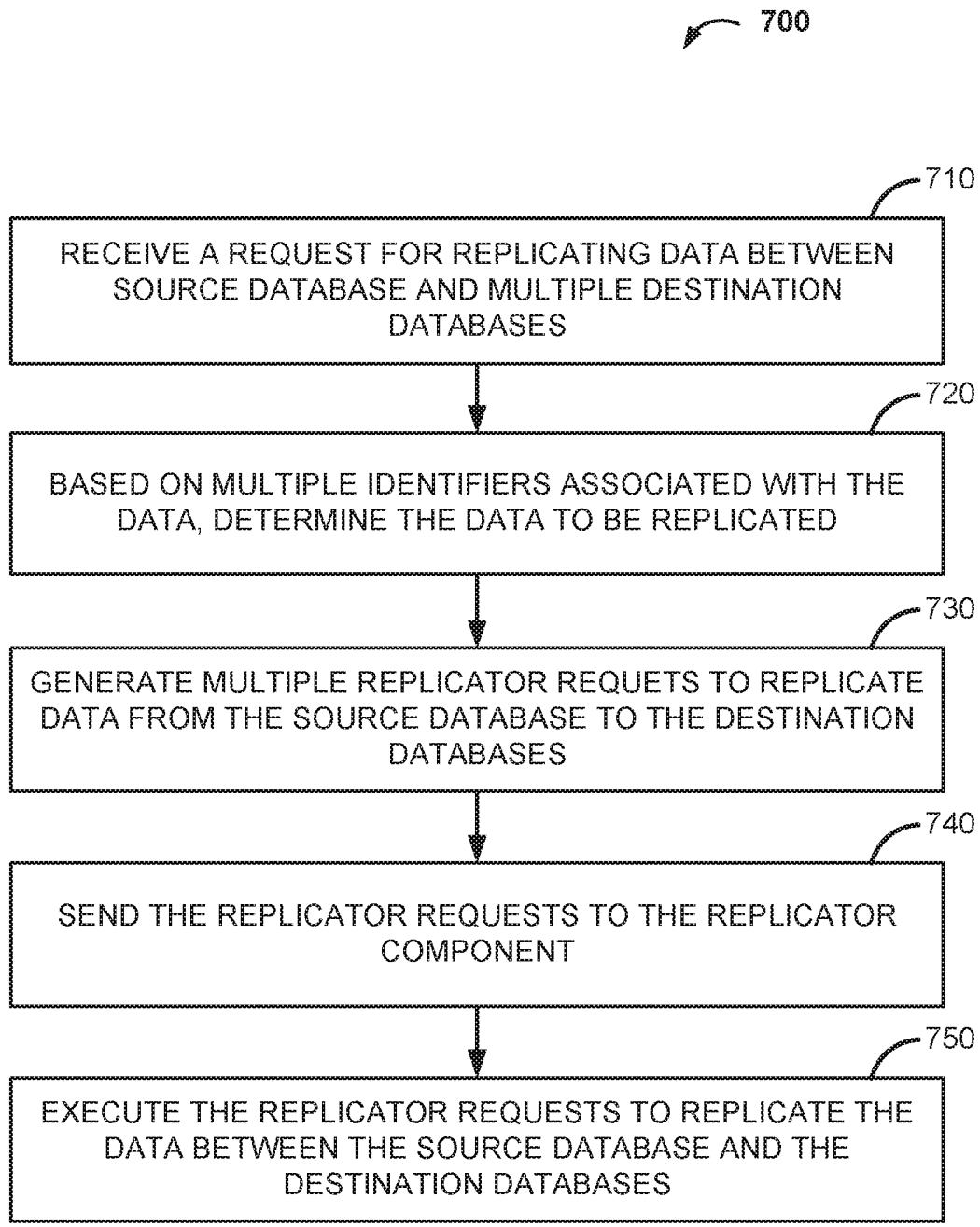
FIG. 7 is a flow diagram illustrating a process to replicate data, according to an embodiment.

FIG. 7 is a flow diagram illustrating process 700 to replicate data, according to an embodiment. In an embodiment, upon establishing a connection with a source database, a request for replicating data between the source database and multiple destination databases is received, at 710. Based on multiple identifiers associated with the data, the data to be replicated is determined, at 720. Multiple replicator requests for replicating data from source database to the destination databases is generated, at 730. The generated replicator requests are sent to replicator component, at 740. The replicator requests are executed, at 750, to replicate the data between the source database and the destination databases.

In an embodiment, the scalability provided by the above framework or deployment of multiple instances of the components may provision processing multiple requests (e.g., data replication) in parallel. The amount of data that may be processed by a specific instance or a combination of components may be configured by the coordinator component. In an embodiment, a high availability of the above described components (e.g., coordinator, replicator, processor, etc.) may provision a mechanism to cope up for replicating data, in an event of a system failure and/or component failures. The above described mechanism including the components may be co-deployed using known communication protocols, thereby simplifying the deployment complexity of the components. Such simplification of deployment may further add to optimizing or reducing the time required to access the data, thereby reducing a time lag and an overall improvement in the functioning of the system. The above described mechanism for replication of data may further be implemented on existing platforms and technologies.

In an embodiment, when the demand for data replication is higher, the framework provides a platform to deploy additional components for processing the data replication requests. In an embodiment, the amount of data processed by the coordinator may be constant, irrespective of the demand for data replication. This may optimize or reduce the amount of memory required to store data at remote locations. For example, when the data is replicated from satellite or remote storage to a central location, the amount of memory used to store data at satellite or remote locations may be reduced, thereby providing an improvement in utility of storage/memory or storage/memory management. The above described mechanism for data replication may reduce the latency and may improve the user experience for consuming data. By having multiple instances of deployment of components in multiple geographically distributed locations, the system (e.g., including the above described mechanism for transferring data) may reduce the time required to serve requests based upon a reduced physical distance from which a request is received. Further, the scalable on-demand feature of deployment and/or utility of the components (e.g., processor, coordinator, replicator, etc.) may be deployed in multiple instances across geographical locations where demand for data replication is rising and reduce instances of deployments when the demand for data replication decreases in other geographical locations.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
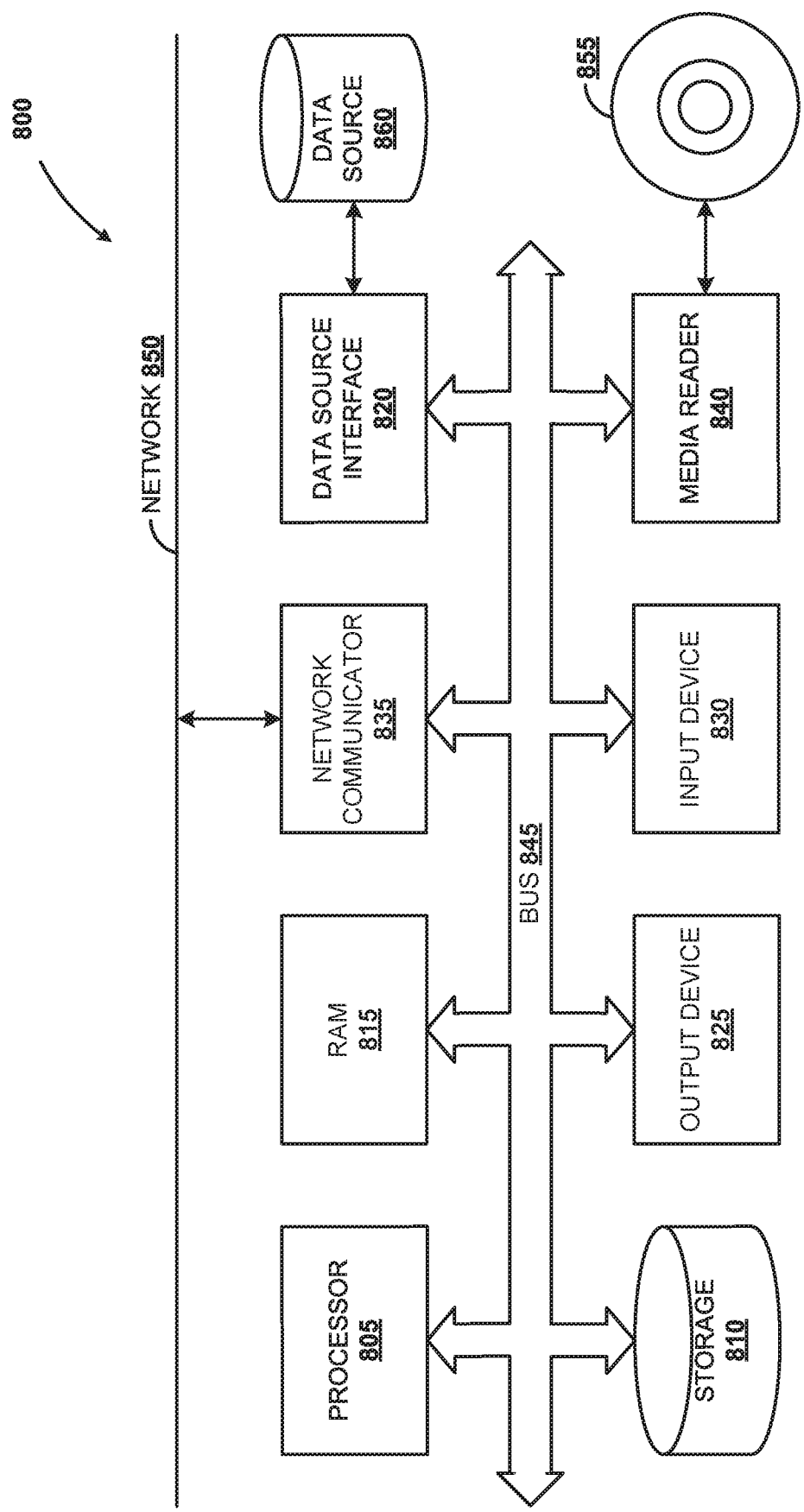
FIG. 8 is a block diagram of a computer system, according to an embodiment.

FIG. 8 is a block diagram of an exemplary computer system 800, according to an embodiment. Computer system 800 includes processor 805 that executes software instructions or code stored on computer readable storage medium 855 to perform the above-illustrated methods. Processor 805 can include a plurality of cores. Computer system 800 includes media reader 840 to read the instructions from computer readable storage medium 855 and store the instructions in storage 810 or in random access memory (RAM) 815. Storage 810 provides a large space for keeping static data where at least some instructions could be stored for later execution. According to sonic embodiments, such as some in-memory computing system embodiments, RAM 815 can have sufficient storage capacity to store much of the data required for processing in RAM 815 instead of in storage 810. In some embodiments, the data required for processing may be stored in RAM 815. The stored instructions may be further compiled to generate other representations of the instructions and dynamically stored in RAM 815. Processor 805 reads instructions from RAM 815 and performs actions as instructed. According to one embodiment, computer system 800 further includes output device 825 (e.g., a display) to provide at least some of the results of the execution as output including, but not limited to, visual information to users and input device 830 to provide a user or another device with means for entering data and/or otherwise interact with computer system 800. Each of these output devices 825 and input devices 830 could be joined by one or more additional peripherals to further expand the capabilities of computer system 800. Network communicator 835 may be provided to connect computer system 800 to network 850 and in turn to other devices connected to network 850 including other clients, servers, data stores, and interfaces, for instance. The modules of computer system 800 are interconnected via bus 845. Computer system 800 includes a data source interface 820 to access data source 860. Data source 860 can be accessed via one or more abstraction layers implemented in hardware or software. For example, data source 860 may be accessed by network 850. In some embodiments data source 860 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings, etc.), hierarchical data (e.g., data in a file system, XML data, etc.), files, a plurality of reports, and any other data source accessible through an established protocol, such as Open Data Base Connectivity (ODBC), produced by an underlying software system. (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details, Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to replicate data between multiple cloud computing environments, comprising:
   at least one processor; and
   one or more memory devices communicatively coupled with the at least one processor and storing instructions related to:
      upon establishing a connection between at least one source database and one or more destination databases, receive a request to replicate data from the at least one source database to the one or more destination databases;
      based on one or more identifiers associated with the data, determining the data to be replicated from the at least one source database to one or more destination databases;
      based on timestamp information associated with the data to be replicated, partitioning the data to be replicated into one or more time intervals, wherein a number of time intervals and a size of each time interval is defined and modified by a coordinator component;
      based on the determination, generating one or more replicator requests for replicating the data from the at least one source database to one or more destination databases, wherein the one or more replicator requests includes information associated with one or more time intervals from a plurality of time intervals and one or more identifiers associated with the data stored in the at least one source database;
      sending the one or more replicator requests to a replicator component; and
      executing, by the replicator component, the one or more replicator requests to replicate the data from the at least one source database to one or more destination databases.

2. The computer system of claim 1, further comprising processing the one or more replicator requests, the processing comprising:
   determining the one or more time intervals associated with the one or replicator requests;
   serializing the data corresponding to the one or more time intervals; and
   compressing the data into one or more binary large objects including the one or more replicator requests and a corresponding metadata information.

3. The computer system of claim 2, further comprising sending the one or more binary large objects to the replicator component.

4. The computer system of claim 3, further comprising:
   de-serializing, by the replicator component, the one or more binary large objects; and
   generating one or more sequel statements based on the corresponding metadata information for the one or more replicator requests.

5. The computer system of claim 4, wherein, in response to the execution of the one or more sequel statements, sending a corresponding one or more acknowledgements indicating a success or a failure of the execution of the replicator requests.

6. A non-transitory computer readable storage medium tangibly storing instructions, which when executed by a computer, cause the computer to execute operations, comprising:
   upon establishing a connection between at least one source database and one or more destination databases, receive a request to replicate data from the at least one source database to the one or more destination databases;
   based on one or more identifiers associated with the data, determining the data to be replicated from the at least one source database to one or more destination databases;
   based on timestamp information associated with the data to be replicated, partitioning the data to be replicated into one or more time intervals, wherein a number of time intervals and a size of each time interval is defined and modified by a coordinator component;
   based on the determination, generating one or more replicator requests for replicating the data from the at least one source database to one or more destination databases, wherein the one or more replicator requests includes information associated with one or more time intervals from a plurality of time intervals and one or more identifiers associated with the data stored in the at least one source database;
   sending the one or more replicator requests to a replicator component; and
   executing, by the replicator component, the one or more replicator requests to replicate the data from the at least one source database to one or more destination databases.

7. The non-transitory computer readable storage medium of claim 6, further comprising processing the one or more replicator requests, the processing comprising:
   determining the one or more time intervals associated with the one or replicator requests;
   serializing the data corresponding to the one or more time intervals; and
   compressing the data into one or more binary large objects including the one or more replicator requests and a corresponding metadata information.

8. The non-transitory computer readable storage medium of claim 7, further comprising sending the one or more binary large objects to the replicator component.

9. The non-transitory computer readable storage medium of claim 8, further comprising:
   de-serializing, by the replicator component, the one or more binary large objects by the replicator component; and
   generating one or more sequel statements based on the corresponding metadata information for the one or more replicator requests.

10. The non-transitory computer readable storage medium of claim 9, wherein, in response to the execution of the one or more sequel statements, sending a corresponding one or more acknowledgements indicating a success or a failure of the execution of the replicator requests.

11. A computer implemented method to replicate data between multiple cloud computing environments, comprising:
   upon establishing a connection between at least one source database and one or more destination databases, receiving a request to replicate data from the at least one source database to the one or more destination databases;

based on one or more identifiers associated with the data, determining the data to be replicated from the at least one source database to one or more destination databases;

based on a timestamp information associated with the data to be replicated, partitioning the data to be replicated into one or more time intervals, wherein a number of time intervals and a size of each time interval is defined and modified by a coordinator component;

based on the determination, generating one or more replicator requests for replicating the data from the at least one source database to one or more destination databases, wherein the one or more replicator requests includes information associated with one or more time intervals from a plurality of time intervals and one or more identifiers associated with the data stored in the at least one source database;

sending the one or more replicator requests to a replicator component; and executing the one or more replicator requests to replicate the data from the at least one source database to one or more destination databases.

12. The computer implemented method of claim 11, further comprising processing the one or more replicator requests comprising:

determining the one or more time intervals associated with the one or replicator requests;

serializing the data corresponding to the one or more time intervals; and compressing the data into one or more binary large objects including the one or more replicator requests and a corresponding metadata information.

13. The computer implemented method claim 12, further comprising sending the one or more binary large objects.

14. The computer implemented method of claim 13, further comprising:

de-serializing the one or more binary large objects; and generating one or more sequel statements based on the corresponding metadata information for the one or more replicator requests.

* * * * *